United States Patent [19]

Sternheim et al.

[11] 4,454,001

[45] Jun. 12, 1984

[54] INTERFEROMETRIC METHOD AND APPARATUS FOR MEASURING ETCH RATE AND FABRICATING DEVICES

[75] Inventors: Marek A. Sternheim, Livermore, Calif.; Willem van Gelder, Lehighton, Pa.

[73] Assignee: AT&T Bell Laboratories, Murray Hill, N.J.

[21] Appl. No.: 412,271

[22] Filed: Aug. 27, 1982

[51] Int. Cl.³ .................. H01L 21/306; B44C 1/22; C03C 15/00; C23F 1/02
[52] U.S. Cl. .................. 156/626; 156/643; 156/646; 156/345; 204/192 E; 204/298; 356/355; 356/382
[58] Field of Search .............. 156/626, 627, 643, 646, 156/654–659.1, 345; 204/164, 192 E, 298; 356/108, 114, 118, 355, 356, 357, 364, 368, 376, 378, 381, 382

[56] References Cited

U.S. PATENT DOCUMENTS

| | | | |
|---|---|---|---|
| 4,039,370 | 8/1977 | Kleinknecht | 156/657 X |
| 4,198,261 | 4/1980 | Busta et al. | 156/626 |
| 4,208,240 | 6/1980 | Latos | 156/643 X |
| 4,367,044 | 6/1983 | Booth et al. | 156/626 X |

OTHER PUBLICATIONS

Solid State Technology, vol. 22, No. 2, 1979, pp. 61–64, Plasma Etch Monitoring with Laser Interferometry by Busta et al.

Primary Examiner—William A. Powell
Attorney, Agent, or Firm—Bernard Tiegerman; Bruce S. Schneider

[57] ABSTRACT

A method and apparatus for measuring etch depth during the etching of a device pattern into a nontransparent substrate, is disclosed. The method makes use of the finding that the device patterns etched into substrates produce diffraction patterns when illuminated. Thus, according to the method, a beam of light is directed onto a region of a substrate, into which region a portion of a device pattern is being etched. The light reflected from this region forms a diffraction pattern and, according to the inventive method, the intensity of a diffraction order is detected and recorded as a function of time during the etching procedure. The intensity of the diffraction order varies with time. The etch rate of the substrate is inversely proportional to the period of the oscillations in the recorded intensity-time curve.

14 Claims, 5 Drawing Figures

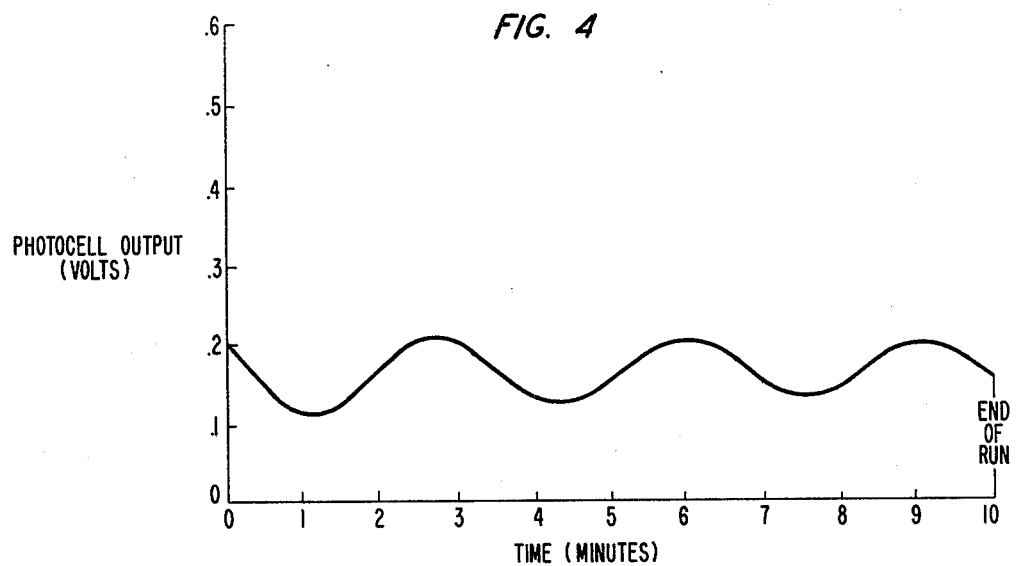
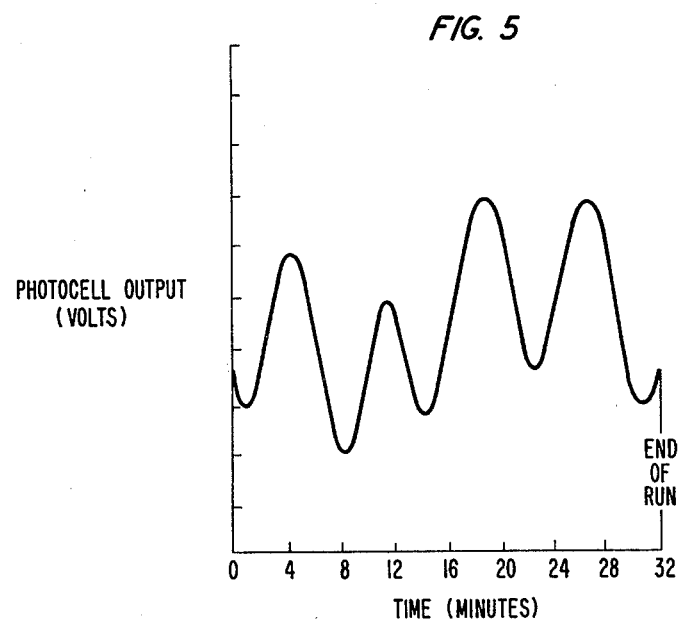

INTERFEROMETRIC METHOD AND APPARATUS FOR MEASURING ETCH RATE AND FABRICATING DEVICES

BACKGROUND OF THE INVENTION

1. Field of the Invention

The invention pertains generally to etching, and in particular etching practiced in the manufacture of information processing devices.

2. Art Background

During the fabrication of devices such as electronic devices, e.g., integrated circuits, and magnetic bubble devices, many process steps involve the etching of patterns into regions of various composition, e.g., semiconductor material and metals. Typically, device patterns are etched into a region by etching the region through a correspondingly patterned etching mask, e.g., an exposed and developed resist. This etching is accomplished by using, for example, wet chemical etching or plasma etching. An important consideration in all of these etching procedures is control of etch depth. For example, it is often desirable to terminate the etching at a desired depth within a substantially homogeneous material. It is also often desirable, if the region to be etched overlies a layer of a second material, to terminate etching at the interface.

Various techniques have been devised for monitoring etching procedures. One such technique is described in the journal article by Busta et al entitled, "Plasma Etch Monitoring With Laser Interferometry", *Solid State Technology*, Vol. 22, No. 2, pp. 61–64 (1979). According to this technique a helium-neon laser is directed through a beam expander and beam splitter onto a uniform area of a substrate undergoing etching within a plasma etching chamber, as shown in FIG. 1. The intensity of the light reflected from the substrate is detected and recorded as a function of time. If the substrate layer being etched is a layer of relatively nontransparent material, e.g., a layer of metal, then the recorded intensity-time curve has a constant amplitude (which depends on the reflectivity of the nontransparent material) until the layer of nontransparent material is etched away. At an interface between two different layers of nontransparent material, e.g., at the interface between two layers of metal, the constant-amplitude reflectivity undergoes a single step change indicating the end point in the etching of one of the layers of nontransparent material.

When the material being etched is relatively transparent to the incident light and overlies a reflective surface, then the measured light intensity goes through a series of minima. Because the material is transparent, the incident light is both reflected from the upper surface of the transparent material and is refracted through the material, as shown in FIG. 2. At the reflective surface, the refracted light is also reflected upwardly through the transparent material, exiting the material to interfere with the light reflected from the upper surface of the material. Etching results in a decreasing optical path length through the transparent material and to varying interference conditions. Additionally, at specific thicknesses destructive interference, which corresponds to a relative minimum in the recorded intensity-time curve, occurs, and at other specific thicknesses constructive interference, which corresponds to a relative maximum, occurs. If the incident light impinges the transparent material at normal incidence, then the change in thickness of the material between any two adjacent minima or any two adjacent maxima in the recorded intensity-time curve is equal to $\lambda/2n$ (see Busta et al, supra, at 62), where $\lambda$ is the wavelength of the laser light and $n$ is the index of refraction of the transparent material. Thus, by measuring the time interval between any two adjacent minima or any two adjacent maxima, the etch rate of the transparent material is determined. Furthermore, by counting the number of cycles or periods in the recorded intensity-time curve, the etch depth is also determined.

The technique described in Busta et al is useful for monitoring depth of etching of a transparent layer of material and in detecting an interface between layers of nontransparent material. However, this technique cannot be used to monitor the etch depth of a nontransparent layer of material.

Another technique for monitoring etching which has only been used for determining the etch rate and etch depth of a transparent layer of substrate material (rather than a nontransparent layer of material) undergoing etching, such as a layer of $SiO_2$ or a layer of $Si_3N_4$, is described in the journal article by Kleinknecht et al entitled "Optical Monitoring of the Etching of $SiO_2$ and $Si_3N_4$ on Si by the Use of Grating Test Patterns," *J. Electrochemical Society*, Vol. 125, pp. 798–803 (1978). In this technique test patterns in the form of diffraction gratings are defined in an area of the photoresist mask distinct from the region containing the device pattern. Upon shining a laser beam onto one of the test patterns, the light reflected from the test pattern forms a diffraction pattern (a pattern of bright and dark fringes). During the etching procedure, the intensity of the first-order diffracted light (one of the bright fringes) reflected from a test pattern is monitored, and recorded as a function of time. This intensity oscillates with time as the etching proceeds because the phase difference between the light reflected from the photoresist grating bars and the light reflected from the underlying layer of $SiO_2$ or $Si_3N_4$ (the layer of material being etched) varies as the thickness of the $SiO_2$ or $Si_3N_4$ is reduced.

To determine the etch rate of the transparent layer of $SiO_2$ or $Si_3N_4$, Kleinknecht et al uses the Fraunhofer integral, (see, e.g., M. Born and E. Wolf, *Principles of Optics*, pp. 401–403, Pergamon Press, Inc., Elmsford, N.Y. (1965)), to derive a theoretical formula for the first-order diffracted intensity reflected from a rectangular grating profile. This formula is then used to produce a theoretical curve for the first-order diffracted intensity as a function of the thickness of the transparent layer being etched. The etch rate is determined by comparing this theoretical curve to the corresponding data taken during etching.

The technique described in Kleinknecht et al is disadvantageous because the portion of the substrate containing the test patterns must necessarily be discarded. In addition, this technique provides a measure of the rate at which a test pattern is etched into the substrate, rather than a measure of the rate at which the desired pattern is etched into the substrate. Sometimes, however, the two etch rates are not identical. Finally, the comparison between the theoretical curve and the measured data is complicated and inconvenient, especially since a theoretical curve must necessarily be calculated for each particular test pattern and for each thickness of photoresist.

Accordingly, an important objective of those engaged in the development of the plasma and chemical etching arts, as applied to the fabrication of devices such as electronic devices and magnetic bubble devices, is the development of a technique for directly monitoring etch rates and etch depths of nontransparent materials which is not wasteful of substrate material and which is relatively convenient.

SUMMARY OF THE INVENTION

The invention resides in the finding that the patterns etched into substrates during the fabrication of devices themselves produce diffraction patterns when illuminated, and that the etch rate and etch depth is determined simply and directly from a plot of the intensity of one of the diffraction orders of the resulting diffracted light, as a function of time. In fact, when these etched patterns are illuminated at normal incidence, then the time period between any two adjacent minima or maxima in the intensity-time curve of the resulting zeroth diffraction order corresponds to an increase in etch depth of $\lambda/2$ (as opposed to $\lambda/2n$, as in Busta et al), where $\lambda$ is the wavelength of the incident light.

The inventive technique for measuring etch rate and etch depth is applicable to nontransparent materials, does not require test patterns and is thus not wasteful of substrate material, directly measures the rate at which a pattern is etched into a substrate, and is relatively convenient.

BRIEF DESCRIPTION OF THE DRAWINGS

A preferred embodiment of the invention is described with reference to the accompanying drawings, wherein:

FIGS. 3 through 5 illustrate embodiments of the invention.

DETAILED DESCRIPTION

Figure 1:
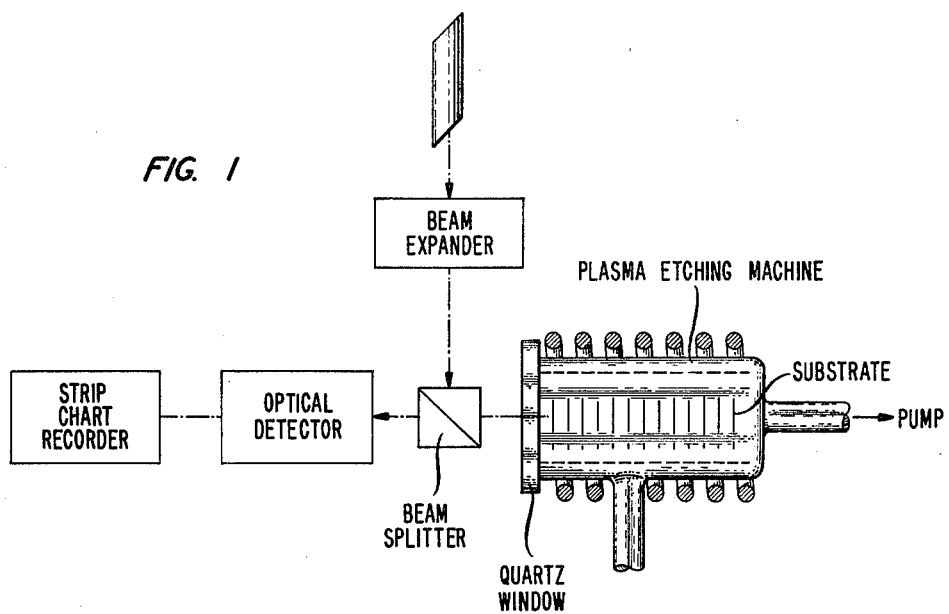
FIGS. 1 and 2 illustrate techniques available for monitoring etching processes.
Figure 2:
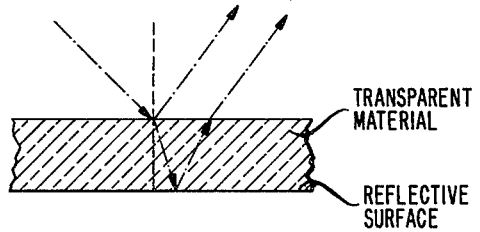

The invention resides, in part, in the finding that the patterns etched into substrates during the fabrication of devices, such as electronic and magnetic bubble devices, produce diffraction patterns when illuminated. Furthermore, the variations in the intensities of the various diffraction orders during etching is related to etch rate and etch depth, e.g., the time interval between successive minima or maxima in the recorded intensity of the zeroth diffraction order reflected from a substrate illuminated at normal incidence is equal to $\lambda/2$, where $\lambda$ is the wavelength of the incident light. Similarly, when a patterned etch mask is applied to a substrate during the fabrication of devices, then the mask-delineated substrate yields the same effect.

The invention is directed to a method and apparatus for determining the rate at which device patterns are etched into reflective, nontransparent layers of material. A material is nontransparent (for a particular wavelength of light), for purposes of the present invention, if insufficient light is transmitted through a control sample of the material, and reflected from a highly reflective, underlying surface having a reflectivity of at least 90 percent, to produce a detectable, varying interference with the light reflected from the upper surface of the control sample during the etching of the control sample. The thickness of the control sample should be greater than $\lambda/2$, where $\lambda$ is the wavelength of the incident light, and the etching of the control sample should be discontinued before the thickness of the control sample has been reduced to $\lambda/2$.

The invention permits the measurement of the etch rate and etch depth of a nontransparent layer of material irrespective of the existence of transparent layers of material beneath the nontransparent layer of material. If a transparent layer of material overlies the nontransparent layer, then the inventive method is useful for detecting the etch rate and etch depth of the nontransparent layer of material once the desired pattern has been etched through the thickness of the transparent layer of material. If a first nontransparent layer of material overlies a second nontransparent layer of material, then the invention permits the measurement of the etch rate during the etching of each of the two nontransparent layers of material, and of the total etch depth as the etching proceeds through the two layers of nontransparent material.

Assuming the material to be etched is suitably nontransparent, the rate at which a device pattern is transferred into a reflective, nontransparent substrate is determined by shining a beam of light, preferably a beam of light having a relatively narrow frequency range, i.e., a frequency range less than one hundredth of one percent of a median frequency, onto a region of the substrate. By way of example, the light beams emitted by most commercially available lasers constitute narrow frequency range light beams. A departure from a beam having a narrow frequency range, while not precluded, will result in a corresponding decrease in the accuracy with which the etch rate and etch depth is determined. The region of the substrate illuminated by the light beam should be one into which a portion of the pattern is being etched. The light reflected from this region will form a diffraction pattern, i.e., a series of bright and dark fringes. However, as the pattern is etched into the substrate the intensity of the various diffraction orders (the bright fringes) are modulated. That is, the intensity of the diffraction orders will oscillate with time (see, for example, FIG. 4), as the etching proceeds. The etch rate and etch depth of the substrate is determined, according to the invention, by detecting and recording the oscillations in the intensity of one of the diffraction orders, as a function of time. Preferably, according to the invention, the intensity of the zeroth diffraction order (also called the central image) is detected and recorded as a function of time (although other diffraction orders are also useful).

If the light incident on the substrate surface undergoing etching impinges this surface at normal incidence, then the zeroth diffraction order will be reflected at right angles to the substrate surface (see, e.g., Jenkins et al, *Fundamentals of Optics*, (McGraw Hill, Inc., 1957), p. 333). It has been found that when the incident light impinges the substrate surface at normal incidence, then the time interval between any two adjacent minima or any two adjacent maxima in the recorded intensity-time curve of the zeroth diffraction order corresponds to an increase in etch depth equal to $\lambda/2$ (not $\lambda/2n$, as in Busta et al), where $\lambda$ is the wavelength of the light incident on the substrate. Thus, in accordance with the invention, the etch rate of the substrate is determined by measuring the time interval between any two adjacent minima or any two adjacent maxima in the recorded intensity of the zeroth diffraction order (a period of the recorded intensity-time curve), and then dividing $\lambda/2$ by this measured time interval. If the etch rate should vary during the etching procedure, then this will readily be observed in the recorded intensity-time curve because the time intervals between succeeding minima or maxima will also vary. The etch depth is determined by counting the number of periods or cycles in the recorded intensity-time curve, and multiplying this number by $\lambda/2$.

For the typical patterns transferred into substrates during the fabrication of devices, which patterns generally include an array of lines whose width and spacing is greater than about $\frac{1}{2}$ $\mu$m but less than about 50 $\mu$m, visible light (having a wavelength ranging from about 3500 Angstroms to about 8000 Angstroms) is useful for illuminating substrates to produce reflected diffraction patterns during etching. For atypical patterns, i.e., for patterns whose linewidth and spacing is smaller than about $\frac{1}{2}$ $\mu$m or greater than about 50 $\mu$m, a control sample is used to determine a suitable wavelength for a given pattern.

The inventive method for measuring the rate at which a pattern is etched into a nontransparent substrate is applicable, in general, to all etching techniques including, but not limited to, plasma and wet chemical etching, reactive sputter etching (also called reactive ion etching), and ion milling. In addition, the inventive method is also applicable to those techniques where a directed beam of energy or a directed beam of charged particles is used to directly pattern a substrate, without the use of an etch mask. Here, the light beam is shined directly onto the exposed substrate surface to produce the desired diffraction pattern.

The invention also resides in the application of the inventive etch rate monitoring technique to the fabrication of devices. That is, in accordance with the invention, a device such as an electronic or magnetic bubble device is fabricated by a series of steps, well known in the art, which includes the steps of etching one or more device patterns into a nontransparent substrate layer. But, in contrast to conventional fabrication techniques, the inventive fabrication method includes the step of monitoring the etch rate and/or etch depth of the nontransparent substrate layer with the inventive etch rate monitoring technique described above. Once the desired patterns have been etched to the desired depth into the nontransparent substrate layer, which etch depth is determined in accordance with the inventive monitoring technique, the device is completed by a series of conventional steps.

In general, the apparatus suitable for measuring etch rate and etch depth, in accordance with the invention, includes a source of light to illuminate the substrate being etched. In addition, an optical detector and recorder are required for detecting and recording the intensity of one of the diffraction orders (preferably the zeroth diffraction order) in the diffraction pattern resulting from the illumination.

Figure 3:
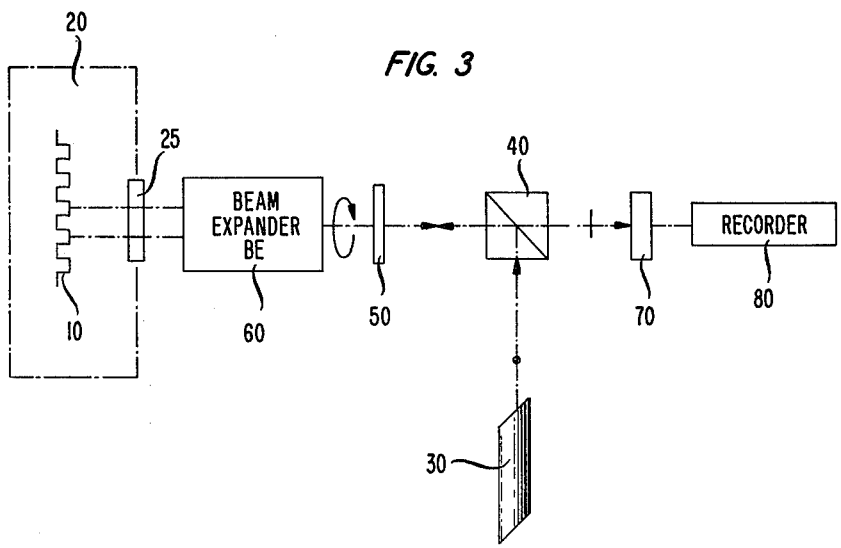

A preferred embodiment of apparatus for measuring etch rate in accordance with the inventive method is shown schematically in FIG. 3. This apparatus, which measures the rate at which a pattern is etched into a substrate 10 undergoing etching in an apparatus 20, such as a plasma or wet chemical reactor, includes a source 30 of coherent, linearly polarized light (the plane of polarization should be perpendicular to the plane of FIG. 3) having a narrow range of frequencies. The light source 30 is, for example, a linearly polarized He-Ne laser emitting light of wavelength approximately equal to 6328 Angstroms. The linearly polarized light emitted by the source 30 is directed to a polarizing beam splitter 40 which reflects the incident light to the left (as pictured in FIG. 3), toward an optical window 25 of the reactor 20 (the substrate 10 being etched is arranged behind the optical window 25). The beam splitter 40 reflects incident, linearly polarized light if the plane of polarization is perpendicular to the plane of FIG. 3, but transmits linearly polarized light if the plane of polarization is parallel to the plane of FIG. 3. The source 30 and beam splitter 40 are appropriately oriented relative to the substrate 10 so that the light reflected to the left (as viewed in FIG. 3) by the beam splitter is directed at normal incidence to the substrate surface being etched.

The light reflected to the left by the beam splitter 40, prior to impinging the substrate 10, first passes through a quarter wave retardation plate 50 which converts the incident, linearly polarized light into circularly polarized light. The circularly polarized light then passes through an optical beam expander 60 and through the optical window 25, to impinge the substrate 10 at normal incidence. The beam expander 60, while not essential to the apparatus, serves to expand the size of the incident light beam, and thus avoids the need for precise alignment of the light beam relative to the substrate 10.

The circularly polarized light of the zeroth diffraction order which is reflected at right angles by the substrate 10 (because the incident light impinges the substrate at normal incidence), passes through the beam expander 60 to the quarter wave plate 50. The quarter wave plate 50 converts the reflected, circularly polarized light into linearly polarized light, with the plane of polarization of the linearly polarized light being parallel to the plane of FIg. 3. Thus, the linearly polarized light exiting the quarter wave plate 50 is transmitted to the right (as viewed in FIG. 3) by the beam splitter 40 because the plane of polarization is now parallel to the plane of FIG. 3. This transmitted light (the zeroth diffraction order) then impinges a conventional photocell 70. The output of the photocell 70 is a voltage signal whose amplitude is proportional to the intensity of the impinging light. The output of the photocell is recorded as a function of time by a conventional recorder 80.

EXAMPLE 1

The inventive method, and the inventive apparatus shown in FIG. 3, were used to measure the rate at which an integrated circuit pattern was plasma etched into a silicon substrate through an aluminum etch mask. The test sample was a 3-inch silicon wafer covered by a layer of patterned aluminum. The aluminum was deposited onto the silicon wafer by conventional e-beam evaporation and then patterned with conventional photolithographic and wet chemical etching techniques. The pattern delineated in the aluminum was the pattern used by Bell Telephone Laboratories, incorporated, in fabricating a 4K static, random access memory chip. This pattern included an array of oval openings, each of which was about 3 microns wide and about 6-9 microns in length. Before the test sample was placed in the plasma reactor, the depth of the openings extending through the aluminum layer, and thus the thickness of the aluminum layer, was measured with an Alpha step profiler and found to be about 8000 Angstroms.

The test sample was then placed on the grounded electrode of a parallel plate, plasma etching machine, and plasma etched in a $CF_3Cl$ atmosphere for 10 minutes. The machine included an optical window through which a light beam could be shined onto the test sample during the etching procedure. The parallel plate electrodes of the plasma etching machine were each 24 inches in diameter, and spaced apart by about one inch.

During the plasma etching procedure a 13.56 MHz rf signal was applied to the power electrode to provide 1.5 kilowatts of power, while the $CF_3Cl$ gas was flowed into the plasma reactor chamber at about 100 ml/min, and while the pressure within the reactor chamber was maintained at 0.4 torr.

The rate at which the integrated circuit pattern was etched into the silicon wafer was monitored with the apparatus depicted in FIG. 3, using the inventive method described above. The light source 30 was a He-Ne laser, which produced a laser beam having a wavelength, $\lambda$, of 6328 Angstroms, and a spot size which was about 1 mm in diameter. The photocell 70 was essentially a silicon photodiode which produces a voltage in response to a light signal. The recorder 80 was a conventional strip chart recorder. A copy of the output of the recorder is shown in FIG. 4.

At the completion of the plasma etching procedure, the sample was removed from the plasma etching machine and the Alpha step profiler was then used to measure the total depth of the openings extending through the aluminum etch mask and into the silicon wafer. This depth was measured to be 1.825 $\mu$m. The layer of aluminum covering the etched silicon wafer was then removed with hydrochloric acid, and the depth of the openings etched into the silicon wafer was then measured with the Alpha step profiler and found to be 1.025 $\mu$m. The difference between these measurements, which must necessarily be the thickness of the aluminum at the completion of the etching procedure, was 0.8 $\mu$m (or 8000 Angstroms), from which it is concluded that the aluminum was not etched during the plasma etching procedure.

The depth of the openings etched into the silicon wafer was calculated by counting the number of periods shown in FIG. 4. The number of periods is 3.13. Because each period corresponds to an increase in etch depth of $\lambda/2 = 0.6328$ $\mu$m/2 = 0.3164 $\mu$m, it follows that the depth of the openings etched into the silicon wafer, as determined from FIG. 4, was equal to $3.13 \times 0.3164$ $\mu$m = 0.99 $\mu$m. Thus, using the Alpha step profiler measurement (1.025 $\mu$m) as the reference, the error in etch depth associated with the inventive method was here less than 4 percent.

EXAMPLE 2

The method and apparatus described in Example 1 were also used to measure the rate at which a pattern was reactive sputter etched into a silicon substrate through a silicon dioxide etch mask. The test sample was a 3-inch silicon wafer covered by a layer of patterned silicon dioxide. The silicon dioxide etch mask was formed by thermally oxidizing the silicon wafer and then patterning the resulting layer of silicon dioxide with conventional photolithographic and wet chemical etching techniques. The pattern delineated in the silicon dioxide was that which is used to fabricate a logic integrated circuit test chip of Bell Laboratories, Incorporated. This chip includes nine different logic circuits as well as an array of 3-centimeter long meander lines whose linewidth/spacing ranges from 4 $\mu$m/2 $\mu$m, to 4 $\mu$m/1 $\mu$m, and to 3 $\mu$m/2 $\mu$m.

The machine used to reactive sputter etch the silicon wafer included a stainless steel, bell jar-shaped reactor chamber which was 24 inches high and 18 inches in diameter. Centrally arranged within the reactor chamber was a cylindrical electrode which was 14 inches high and which was hexagonal in cross-section. Opposed, parallel sides of the hexagonal electrode were spaced apart by about 6 inches.

Before the test sample was placed in the reactor chamber the thickness of the silicon dioxide layer was measured with a Nanospec spectral photometer to be 4150 Angstroms (0.4150 $\mu$m).

The test sample was mounted on a side of the hexagon-shaped electrode, and reactive sputter etched in a $Cl_2$ atmosphere for 32 minutes. During the etching procedure the walls of the reactor chamber were grounded, a 13.56 MHz rf signal was applied to the hexagon-shaped electrode, while $Cl_2$ was flowed into the reactor chamber at 17 ml/min, and while the pressure within the reactor chamber was maintained at 10 millitorr. The d.c. bias voltage between the walls of the reactor chamber and the hexagon-shaped electrode was 300 volts, and the power density was 0.15 watts/cm$^2$. During the etching procedure a He-Ne laser was shined at normal incidence onto the test sample through an optical window of the reactor chamber, and the intensity of the zeroth order diffraction was detected and recorded with the apparatus described in Example 1. A copy of the recorded voltage signal is shown in FIG. 5.

After being etched, the sample was removed from the reactive sputter etching machine, and the thickness of the silicon dioxide layer was once again measured with the Nanospec spectral photometer, and found to be 1125 Angstroms. Thus, a 3025 Angstrom-thick layer of silicon dioxide was etched away during the reactive sputter etching procedure. Then, the remaining silicon dioxide covering the etched silicon wafer was chemically etched away with buffered HF, and the depth of the openings etched into the silicon wafer was measured with an Alpha step profiler to be 1.27 $\mu$m.

As is evident from FIG. 5, the amplitude of the recorded voltage signal varies with etch time. It is believed that these amplitude changes correspond to beats produced by the superposition of the interference signals resulting from the etching of the silicon and the etching of the silicon dioxide.

The depth of the openings etched into the silicon wafer was calculated by counting the number of periods in the recorded signal shown in FIG. 5. The number of periods is 4.26. Each period corresponds to an increase in etch depth of $\lambda/2 = 0.3164$ $\mu$m, and thus the etch depth, as determined from FIG. 5, is equal to $4.26 \times 0.3164$ $\mu$m = 1.35 $\mu$m. Thus, using the Alpha step measurement (1.27 $\mu$m) as the reference, the error in etch depth associated with the inventive method was about 6 percent.

What is claimed is:

1. A method for fabricating a device, comprising the steps of:
    etching a pattern into a substrate; and
    monitoring said etching of said substrate by illuminating a region of said substrate with light and sensing a portion of the light reflected from said region, characterized in that
    said region of said substrate is a region into which a portion of said pattern is being etched,
    said sensing step includes the step of detecting the intensity of a diffraction order of the light reflected from said region, and
    said method further comprises the step of terminating said etching based on the detected number of cycles of said intensity.

2. The method of claim 1 wherein said substrate includes a patterned etch mask.

3. The method of claim 1 wherein said diffraction order is the zeroth diffraction order.

4. The method of claim 1 wherein said etching is produced by plasma etching.

5. The method of claim 1 wherein said etching is produced by reactive ion etching.

6. The method of claim 1 wherein said etching is produced by ion milling.

7. The method of claim 1 wherein said etching is produced by wet chemical etching.

8. The method of claim 1 wherein said etching is produced by a directed beam of energy.

9. The method of claim 1 wherein said etching is produced by a directed beam of charged particles.

10. The method of claim 1 further comprising the steps of performing the steps necessary to complete the fabrication of said device.

11. A method for measuring the etch depth of a substrate during a process in which a device pattern is etched into said substrate, comprising the steps of:
 illuminating a region of said substrate with light; and
 sensing a portion of the light reflected from said region, characterized in that
 said region of said substrate is a region into which a portion of said pattern is being etched,
 said sensing step includes the step of detecting the intensity of a diffraction order of the light reflected from said region, and
 said method further comprises the step of terminating said etching based on the detected number of cycles of said intensity.

12. The method of claim 11 wherein said substrate is covered by a patterned etch mask.

13. The method of claim 11 wherein said diffraction order is the zeroth diffraction.

14. Apparatus for measuring the etch rate of a substrate, during a process in which a device pattern is etched into said substrate, comprising:
 first means for illuminating a region of said substrate with light; and
 second means for sensing a portion of the light reflected from said region, characterized in that
 said first means is adapted for directing light onto a region of said substrate into which a portion of said pattern is being etched,
 said second means includes means for detecting the intensity of a diffraction order of the light reflected from said region, and
 said etch rate is inversely proportional to a period of the variation with time of said intensity.

* * * * *